US012278027B2

(12) United States Patent
Tanaka et al.

(10) Patent No.: US 12,278,027 B2
(45) Date of Patent: Apr. 15, 2025

(54) WIRING MEMBER AND METHOD OF MANUFACTURING THE WIRING MEMBER

(71) Applicant: Sumitomo Wiring Systems, Ltd., Mie (JP)

(72) Inventors: Yoshiaki Tanaka, Mie (JP); Masaki Mizushita, Mie (JP); Tetsuya Nishimura, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 129 days.

(21) Appl. No.: 17/912,375

(22) PCT Filed: Mar. 2, 2021

(86) PCT No.: PCT/JP2021/007911
§ 371 (c)(1),
(2) Date: Sep. 16, 2022

(87) PCT Pub. No.: WO2021/192852
PCT Pub. Date: Sep. 30, 2021

(65) Prior Publication Data

US 2023/0162884 A1 May 25, 2023

(30) Foreign Application Priority Data

Mar. 23, 2020 (JP) ................................ 2020-050721

(51) Int. Cl.
*H01B 7/08* (2006.01)

(52) U.S. Cl.
CPC ................................ *H01B 7/0846* (2013.01)

(58) Field of Classification Search
CPC ............................ H01B 7/0846; H01B 7/363
See application file for complete search history.

(56) References Cited

U.S. PATENT DOCUMENTS 6,225,561 B1 * 5/2001 Mori .................. B60R 16/0207 174/154
6,385,845 B2 * 5/2002 Mori .................. B60R 16/0207 29/850

(Continued)

FOREIGN PATENT DOCUMENTS

JP 09-050713 2/1997
JP 10-069821 3/1998

(Continued)

OTHER PUBLICATIONS

International Search Report issued in International Patent Application No. PCT/JP2021/007911, dated May 18, 2021, along with an English translation thereof.

(Continued)

*Primary Examiner* — Timothy J Thompson
*Assistant Examiner* — Rhadames Alonzo Miller
(74) *Attorney, Agent, or Firm* — Greenblum & Bernstein, P.L.C.

(57) ABSTRACT

A wiring member includes: a base member having a holding surface; and at least one wire-like transmission member held on the holding surface, wherein at least one missing wire-like transmission member identification mark indicating at least one missing wire-like transmission member position is provided on the holding surface.

6 Claims, 5 Drawing Sheets

(56) References Cited

U.S. PATENT DOCUMENTS

| | | | | |
|---|---|---|---|---|
| 2001/0006112 | A1 | 7/2001 | Mori | |
| 2019/0392963 | A1* | 12/2019 | Ishida | H01B 7/0045 |

FOREIGN PATENT DOCUMENTS

| | | |
|---|---|---|
| JP | 11-308740 | 11/1999 |
| JP | 2018-137208 | 8/2018 |

OTHER PUBLICATIONS

International Preliminary Report on Patentability issued in International Patent Application No. PCT/JP2021/007911, dated Sep. 29, 2022, along with an English translation thereof.

Japan Office Action issued in Japan Patent Application No. 2020-50721, dated Aug. 8, 2023, together with English translation thereof.

China Office Action issued in China Patent Application No. 202180023048.2, dated Jan. 18, 2025, together with English translation thereof.

* cited by examiner

WIRING MEMBER AND METHOD OF MANUFACTURING THE WIRING MEMBER

TECHNICAL FIELD

The present disclosure relates to a wiring member.

BACKGROUND ART

Patent Document 1 discloses a wire harness including a functional exterior member formed into a sheet-like shape and an electrical wire disposed to overlap with the functional exterior member in at least a part of a region along a longitudinal direction. At least a part of a portion where an insulating covering of the electrical wire and the functional exterior member overlap with each other is welded in this wire harness.

PRIOR ART DOCUMENTS

Patent Documents

Patent Document 1: Japanese Patent Application Laid-Open No. 2018-137208

SUMMARY

Problem to be Solved by the Invention

There is a case where plural types of a wire harness are set for wire harnesses provided in the same portion in a vehicle. The plural types of the wire harness are set in accordance with a difference in a grade and an optional component, for example, and can be distinguished by a combination of electrical wires to be incorporated therein. In such a case, it is desired that a type of a wiring member can be easily identified.

Accordingly, an object of the present disclosure is to provide a technique capable of easily identifying a type of a wiring member.

Means to Solve the Problem

A wiring member according to the present disclosure is a wiring member including: a base member having a holding surface; and at least one wire-like transmission member held on the holding surface, wherein at least one missing wire-like transmission member identification mark indicating at least one missing wire-like transmission member position is provided on the holding surface.

Effects of the Invention

According to the present disclosure, a type of a wiring member can be easily identified.

DESCRIPTION OF EMBODIMENT(S)

Description of Embodiment of Present Disclosure

Figure 1:
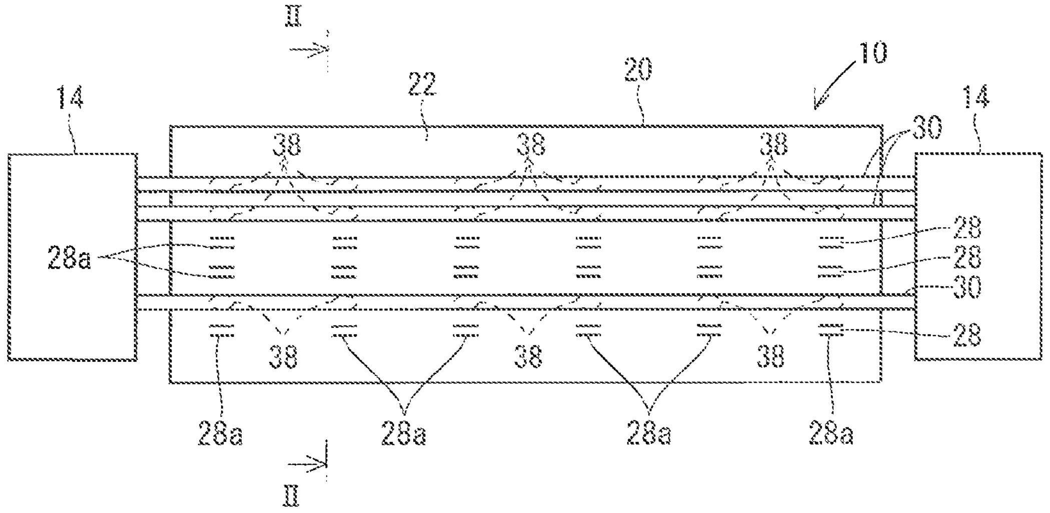
FIG. 1 is a plan view illustrating a wiring member according to an embodiment.

Embodiments of the present disclosure are listed and described firstly.

A wiring member according to the present disclosure is as follows.

(1) A wiring member includes: a base member having a holding surface; and at least one wire-like transmission member held on the holding surface, wherein at least one missing wire-like transmission member identification mark indicating at least one missing wire-like transmission member position is provided on the holding surface. According to the present wiring member, a type of a wiring member is easily identified using a missing wire-like transmission member on a holding surface as a clue.

(2) In the wiring member according to (1), the plurality of missing wire-like transmission member identification marks may be provided to indicate the plurality of missing wire-like transmission member positions. The plurality of missing wire-like transmission member positions can be recognized using the plurality of missing wire-like transmission member identification marks as a clue. Accordingly, more various types of a wiring member can be identified.

(3) In the wiring member according to (1) or (2), it is applicable that the missing wire-like transmission member identification mark includes a plurality of marks provided in each one of the missing wire-like transmission members to indicate routes of the missing wire-like transmission members. Accordingly, a type of a wiring member is easily identified using a route of a missing wire-like transmission member as a clue.

(4) It is applicable that the wiring member according to any one of (1) to (3) includes the plurality of wire-like transmission members, wherein at least a part of the plurality of wire-like transmission members is held in a parallel state on the holding surface, and the missing wire-like transmission member identification mark includes at least one of a middle identification mark provided between the plurality of wire-like transmission members or an outer side identification mark provided on an outer side position of the plurality of wire-like transmission members in an arrangement direction in a portion in which at least a part of the plurality of wire-like transmission members is held in a parallel state on the holding surface. A type of the wiring member is identified using at least one of the middle identification mark and the outer side identification mark as a clue.

(5) In the wiring member according to any one of (1) to (4), the wire-like transmission member is fused to the holding surface via a fusion part, and the missing wire-like transmission member identification mark is provided adjacent to the fusion part. The identification mark can be easily formed when the wire-like transmission member is fused to the holding surface.

Details of Embodiment of Present Disclosure

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment

Figure 2:
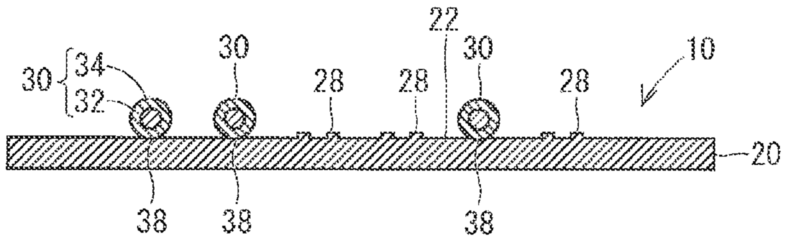
FIG. 2 is a II-II line cross-sectional view in FIG. 1.

A wiring member according to an embodiment is described hereinafter. FIG. 1 is a plan view illustrating a wiring member 10. FIG. 2 is a 11-11 line cross-sectional view in FIG. 1.

The wiring member 10 includes a base member 20 and a wire-like transmission member 30.

The base member 20 includes a holding surface 22. The wire-like transmission member 30 is disposed on the holding surface 22. The wire-like transmission member 30 is held to form a predetermined route on the holding surface 22. That is to say, the base member 20 is a member having a holding surface 22 holding the wire-like transmission member 30 along the predetermined route. It is sufficient that the base member 20 is a member with the holding surface 22 for holding the wire-like transmission member 30. The base member 20 may be formed into a sheet-like shape or a three-dimensional shape. The holding surface 22 may be a planar surface, a curved surface, a convex-concave surface, or a surface in which a planar surface and a curved surface are combined.

In the description herein, the base member 20 is a member having a flat part, more specifically, a sheet member 20 which can be bended.

The sheet member 20 may be formed into a shape along a wiring route of the wire-like transmission member 30. Herein, the sheet member 20 is formed into a quadrangular shape elongated in one direction. The sheet member may be a bended. The sheet member may have a portion bended to have a curved shape. The sheet member may have a branched portion.

A material constituting the sheet member 20 is not particularly limited, however, the sheet member 20 may be formed of a material containing resin of polyvinyl chloride (PVC), polyethylene terephthalate (PET), or polypropylene (PP), for example. The sheet member 20 may be a sheet material with an inner portion evenly filled or a non-woven sheet, for example. The sheet member 20 may contain a material such as metal. The sheet member 20 preferably has flexibility of being easily bended in a thickness direction. The sheet member 20 may be made up of a single layer or a plurality of stacked layers. When the sheet member is made up of the plurality of stacked layers, it is considered that a resin layer and a resin layer are stacked, for example. More specifically, for example, the sheet member 20 is considered to be made up of a resin sheet material with an inner portion evenly filled and a non-woven sheet stacked on each other. It is also considered that the sheet member 20 is made up of a resin layer and a metal layer stacked on each other, for example.

The wire-like transmission member 30 is assumed to be a wire-like transmission member connecting components in a vehicle so as to be able to perform communication therebetween or supply electrical power. The wire-like transmission member 30 is disposed on a side of the holding surface 22 described above to extend along a wiring route in accordance with a position of a component to which the wire-like transmission member 30 is connected.

More specifically, the wire-like transmission member 30 may be a wire-like member transmitting electrical power or light, for example. For example, the wire-like transmission member 30 may be a general wire having a core wire 32 and a covering layer 34 around the core wire 23, or may also be a bare wire, a shield wire, a twisted wire, an enamel wire, a nichrome wire, or an optical fiber.

The wire-like transmission member 30 transmitting the electrical power may be various kinds of signal wires or various kinds of power wires. Some of the wire-like transmission members transmitting the electrical power may be used as an antenna or coil, for example, transmitting or receiving a signal or electrical power to or from a space.

The wire-like transmission member 30 may be a single wire-like object or a composite object of a plurality of wire-like objects (a twisted wire and a cable made up of a plurality of wire-like objects covered by a sheath).

The wire-like transmission member 30 is held on the holding surface 22 of the sheet member 20. It is sufficient that the wire-like transmission member 30 is held along a constant route on the sheet member 20, thus a specific configuration for holding is not particularly limited.

For example, the wire-like transmission member 30 may be fused (or welded) to the holding surface of the sheet member 20. A fusion part thereby formed has a configuration that a part of at least one of the wire-like transmission member 30 or the sheet member 20 is melted and adheres to the other side member. The wire-like transmission member 30 and the sheet member 20 may be fused by ultrasonic fusion or thermal fusion. It is also applicable that a surface of at least one of the wire-like transmission member 30 or the sheet member 20 is melted by a solvent to fuse the wire-like transmission member 30 and the sheet member 20. For example, the wire-like transmission member 30 may be fixed to the sheet member 20 by an adhesive agent or a double-sided tape, for example. For example, the wire-like transmission member 30 may be sewn to the sheet member 20 by a sewing thread, for example. It is also applicable that an adhesive tape is attached to the holding surface 22 of the sheet member 20 across the wire-like transmission member 30 in a state where the wire-like transmission member 30 is disposed on the holding surface 22 of the sheet member 20 to hold the wire-like transmission member 30 on the holding surface 22 of the sheet member 20, for example.

In an example described herein, the wire-like transmission member 30 is an electrical wire 30 having a core wire 32 and a covering layer 34. Also described is an example that the electrical wire 30 is fused to the holding surface 22 of the sheet member 20 via a fusion part 38. In each drawings, the electrical wires 30 may be held straight on the holding surface 22 or curved and held thereon. When the plurality of electrical wires 30 are located, some of the plurality of electrical wires 30 may be branched from the other some thereof. An end portion of the electrical wire 30 extends from an end portion of the sheet member 20. The end portion of the electrical wire 30 is connected to a connector 14.

A missing wire-like transmission member identification mark 28 indicating a missing wire-like transmission member position is provided in the holding surface 22. Any mark is applicable to the missing wire-like transmission member identification mark 28 as long as it can be visually recognized. For example, the missing wire-like transmission member identification mark 28 may be provided by a concave-convex shape formed in a surface of the sheet member 20. For example, the missing wire-like transmission member identification mark 28 may be formed by a coating material adhering to the surface of the sheet member 20. Described in the present embodiment is an example that the missing wire-like transmission member identification mark 28 is provided by a concave-convex shape formed in the surface of the sheet member 20. In FIG. 1 and FIG. 2, two short concave-convex portions are formed in the holding surface 22 at an interval corresponding to a diameter of the electrical wires 30, thus the missing wire-like transmission member identification mark 28 is formed. With regard to a sign 28 of the missing wire-like transmission member identification mark 28, a parenthesized number may be added after the sign 28 for convenience of distinction.

A missing wire-like transmission member position is described. Firstly, the missing wire-like transmission member is a wire-like transmission member which may be held on the holding surface depending on a type of the wiring member, but is not actually held. The missing wire-like transmission member position is a position in which a wire-like transmission member corresponding to such a missing wire-like transmission member may be held.

A more specific example is described with reference to FIG. 3. That is to say, assumed is a wiring member 110 incorporated into a certain portion located in a vehicle. The wiring member 110 electrically connects two sections in a vehicle, for example. The wiring member 110 may include a common electrical wire 30 regardless of a difference in a grade and optional component in a vehicle or an electrical wire 30 which is incorporated or is not incorporated depending on a difference in a grade and optional component. Assumed is the wiring member 110 including a largest number of electrical wires 30 for convenience of description. Six electrical wires 30 in the wiring member 110 may be distinguished as electrical wires 30 (1), 30(2), 30(3), 30(4), 30(5), and 30(6) as necessary.

Wiring members 110B, 110C, and 110D, each of which is similar to the wiring member 110 except that some electrical wire 30 is omitted, are set. The electrical wires 30(1), 30(2), 30(3), 30(4), and 30(5) are held on the holding surface 22 of the wiring member 1101B, and the electrical wire 30(6) is omitted. That is to say, the electrical wire 30(6) is a missing wire-like transmission member. The electrical wires 30(*l*), 30(4), and 30(5) are held on the holding surface 22 of the wiring member 110C, and the electrical wires 30(2), 30(3), and 30(6) are omitted. That is to say, the electrical wires 30(2), 30(3), and 30(6) are missing wire-like transmission members. The electrical wires 30(1), 30(2), and 30(5) are held on the holding surface 22 of the wiring member 1101), and the electrical wires 30(3), 30(4), and 30(6) are omitted. That is to say, the electrical wires 30(3), 30(4), and 30(6) are missing wire-like transmission members.

Figure 3:
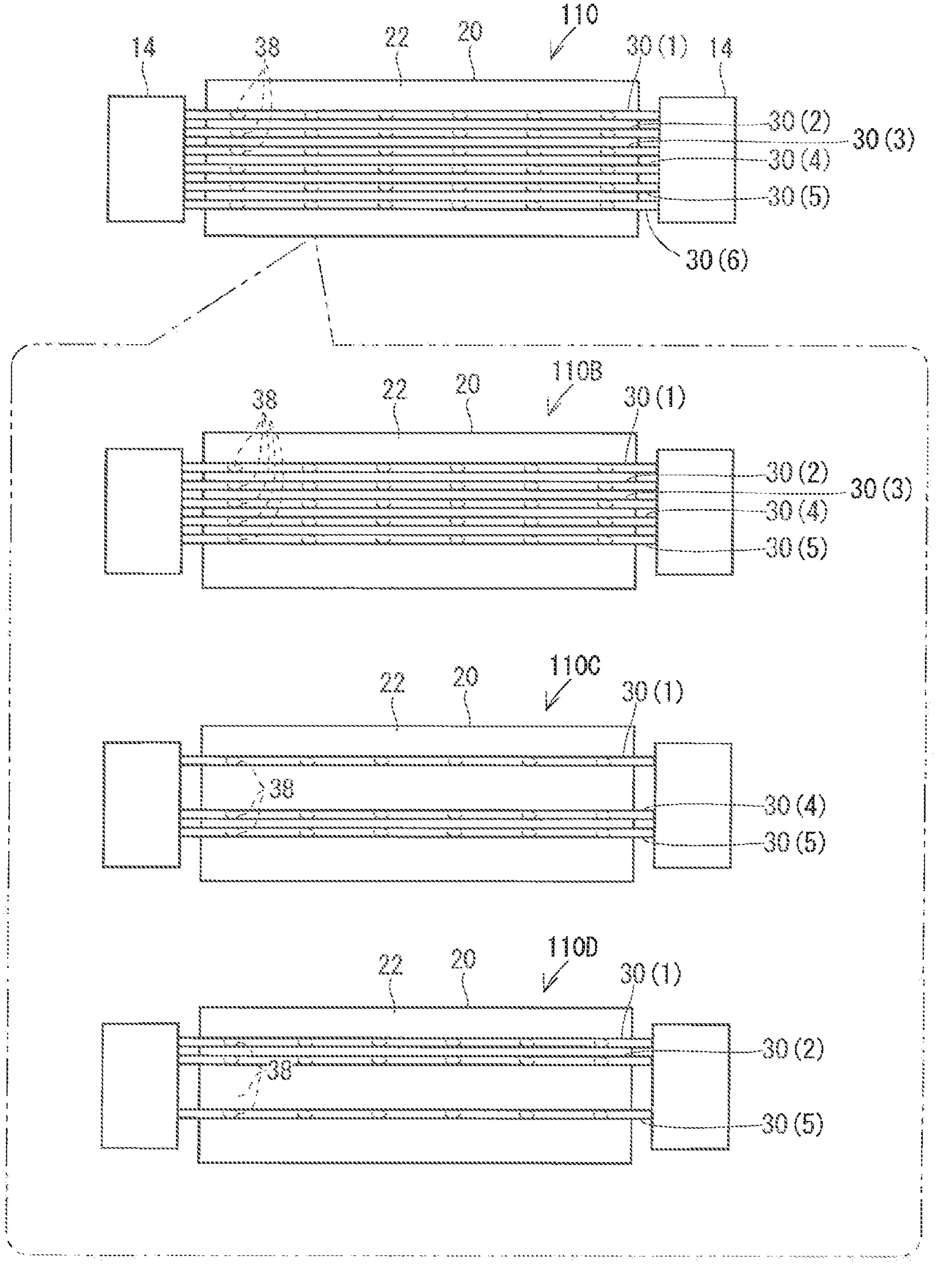
FIG. 3 is an explanation diagram illustrating plural types of a wiring member.

As understood from FIG. 3, when one of the wiring members 110B, 110C, and 110D are solely observed, it is hard to recognize which electrical wire 30 is omitted. Accordingly, it is difficult to identify a type of the wiring members 110B, 110C, and 110D. For example, when the wiring member 110B is observed, it is hard to even recognize whether the omitted electrical wire (missing wire-like transmission member) is located. Also when the wiring members 110C and 110D are observed, it is hard to recognize whether a gap between the electrical wires 30 is a gap originally located or a gap caused by the omitted electrical wire (missing wire-like transmission member)

Figure 4:
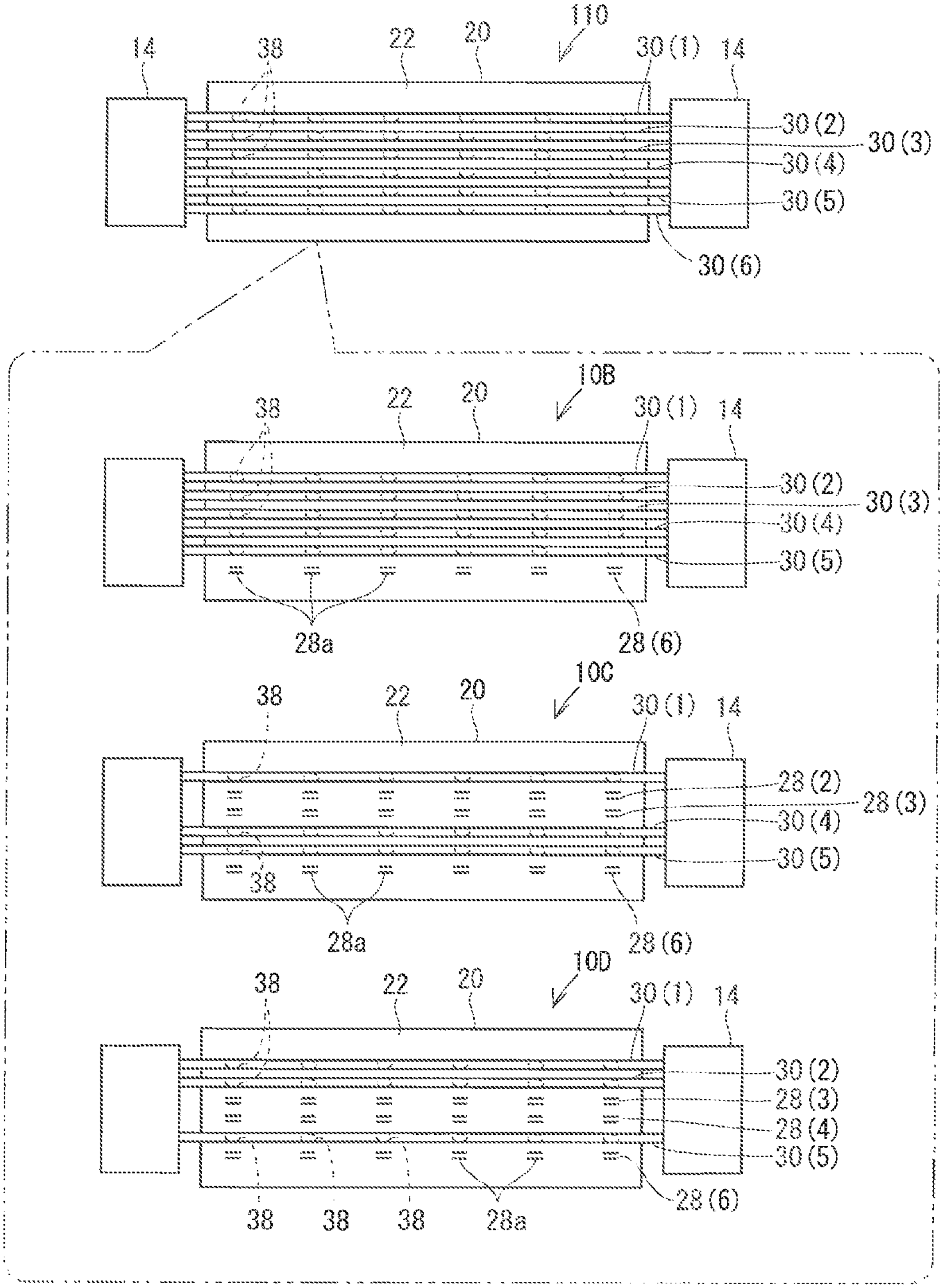
FIG. 4 is an explanation diagram illustrating plural types of a wiring member.

In contrast, as illustrated in FIG. 1 or FIG. 4, when the missing wire-like transmission member identification mark 28 is provided in the missing wire-like transmission member position, a position where the electrical wire 30 is omitted is easily recognized. In FIG. 4, the wiring member 110B provided with the missing wire-like transmission member identification mark 28 is distinguished as a wiring member 10B, the wiring member 110C provided with the missing wire-like transmission member identification mark 28 is distinguished as a wiring member 10C, and the wiring member 110D provided with the missing wire-like transmission member identification mark 28 is distinguished as a wiring member 10D, For example, in the wiring member 10B, the missing wire-like transmission member identification mark 28(6) is provided in a position of the omitted electrical wire 30(6). In the wiring member 10C, the missing wire-like transmission member identification marks 28(2), 28(3), and 28(6) are provided in positions of the omitted electrical wires 30(2), 30(3), and 30(6). In the wiring member 10D, the missing wire-like transmission member identification marks 28(3). 28(4), and 28(6) are provided in positions of the omitted electrical wires 30(3), 30(4), and 30(6). The wiring member 10 illustrated in FIG. 1 and FIG. 2 corresponds to the wiring member 101) in FIG. 4. Thus, when viewing the wiring members 10B, 10C, and 10D, it can be easily recognized which one of the electrical wires 30(1), 30(2), 30(3), 30(4), 30(5), and 30(6) is held or omitted. The type of the wiring members 110, 10B, 10C, and 10D can be thereby easily identified.

In the wiring members 10C and 20D illustrated in FIG. 4, the plurality of missing wire-like transmission member identification marks 28 indicating the plurality of missing wire-like transmission member positions, respectively, are provided. For example, in the wiring member 10C, each of the plurality of missing wire-like transmission member identification marks 28(2). 28(3), and 28(6) indicates a corresponding missing wire-like transmission member position. Only one missing wire-like transmission member identification mark 28(6) indicating one missing wire-like transmission member position may be provided as with the wiring member 10B.

As with the wiring members 10C and 10D, the missing wire-like transmission member identification mark 28 may include a middle identification mark provided between the plurality of electrical wires 30 in a parallel holding portion in a configuration that at least a part of the plurality of electrical wires 30 is held on the holding surface 22 in a parallel state. The missing wire-like transmission member identification marks 28(2) and 28(3) are middle identification marks in the wiring member 10C. The missing wire-like transmission member identification marks 28(3) and 28(4) are middle identification marks in the wiring member 10D.

As with the wiring members 10B, 10C, and 10D, the missing wire-like transmission member identification mark 28 may include an outer side identification mark provided in an outer side position in the arrangement direction in a parallel holding portion in a configuration that at least a part of the plurality of electrical wires 30 is held on the holding surface 22 in a parallel state. The missing wire-like transmission member identification mark 28(6) is the outer side identification mark in the wiring members 10B, 10C, and 10D.

Figure 5:
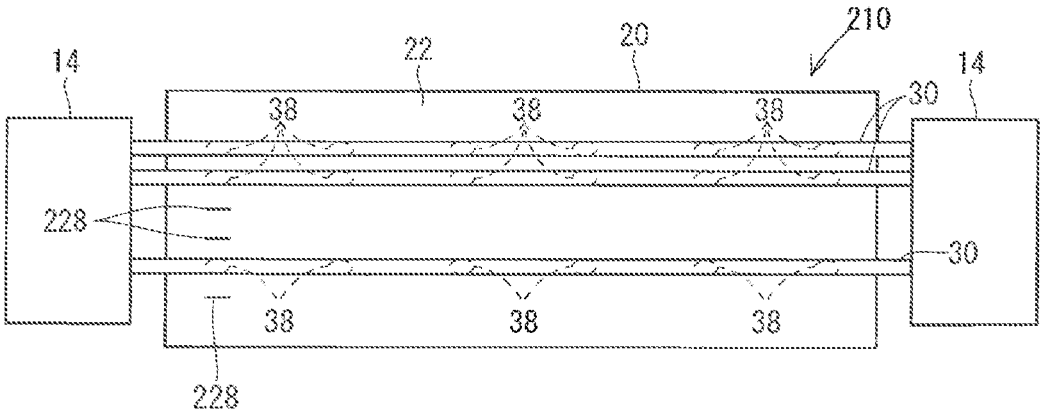
FIG. 5 is a plan view illustrating a wiring member according to a modification example.

Each missing wire-like transmission member identification mark 28 described above is formed along a route of the corresponding electrical wire 30. Thus, the missing wire-like transmission member identification mark 28 includes a plurality of marks 28*a* provided for each corresponding missing wire-like transmission member (electrical wire) 30 to indicate a route of the corresponding missing wire-like transmission member (electrical wire) 30. The missing wire-like transmission member identification mark 28 needs not necessarily indicate the route of the corresponding missing wire-like transmission member (electrical wire) 30. For example, as with the wiring member 210 illustrated in FIG. 5, a missing wire-like transmission member identification mark 228 may indicates only one position on the route of the corresponding missing wire-like transmission member (electrical wire).

The missing wire-like transmission member identification mark 28 may be provided adjacent to the fusion part 38. In the present embodiment, each electrical wire 30 is fused by the plurality of fusion parts 38. The plurality of fusion parts 38 are provided at a predetermined pitch in the extension direction of the electrical wire 30. The pitch of the plurality of fusion parts 38 may be constant or may be changed. In other words, the electrical wire 30 is intermittently fused to the holding surface 22 by the plurality of fusion parts 38.

The missing wire-like transmission member identification mark 28 also includes the plurality of marks 28*a* intermittently provided along a route of the corresponding electrical wire 30. The plurality of marks 28*a* are formed at the same pitch as the plurality of fusion parts 38. Thus, the plurality of marks 28*a* are formed adjacent to the plurality of fusion parts 38. The plurality of marks 28*a* of the missing wire-like transmission member identification mark 28 can be easily formed using a device for fusion and thermal energy at a time of fusing the electrical wires 30 to the holding surface 22 to form the fusion part 38, for example.

According to the wiring members 10B, 10C, and 10D having such a configuration, it is easily identified which electrical wire 30 is missing or is not missing for the wiring member 110 using the missing wire-like transmission member identification mark 28 in the holding surface 22 as a clue. Accordingly, the type of the wiring members 110, 10B, 10C, and 10D can be easily identified.

The plurality of missing wire-like transmission member identification marks 28 are provided in the wiring members 10B, 10C, and 10D. Accordingly, various types of the wiring members 10B, 10C, and 10D can be easily identified except for a plurality of missing electrical wires in the electrical wires 30(*l*), 20(2), 30(3), 30(4), 30(5), and 30(6).

The missing wire-like transmission member identification mark 28 indicates the route of the electrical wire 30. Thus, a route of the missing electrical wire 30 and a connection destination thereof, for example, can be recognized. Accordingly, the wiring members 10B, 10C, and 10D can be more easily identified.

When the missing wire-like transmission member identification mark 28 includes the missing wire-like transmission member identification marks 28(2), 28(3), and 28(4) as the middle identification marks provided between the electrical wires 30 in a parallel portion of the plurality of electrical wires 30, it is easily identified whether the gap between the plurality of electrical wires 30 is simply a gap or a gap caused by the missing electrical wire 30. Accordingly, the wiring members 101, 10C, and 10D can be more easily identified. When the missing wire-like transmission member identification mark 28 includes the missing wire-like transmission member identification mark 28(6) as the outer side identification marks provided on the outer side of the electrical wire 30 in the arrangement direction in the parallel portion of the plurality of electrical wires 30, it is easily identified whether the gap on the outer side of the plurality of electrical wires 30 is simply a gap or a gap caused by the missing electrical wire 30. Accordingly, the wiring members 10B, 10C, and 10D can be more easily identified.

When the missing wire-like transmission member identification mark 28 is provided adjacent to the fusion part 38, each mark 28*a* of the missing wire-like transmission member identification mark 28 can be easily formed at the time of fusing the electrical wires 30 to the holding surface 22.

Each configuration described in the embodiment and each modification example can be appropriately combined as long as they are not contradictory.

EXPLANATION OF REFERENCE SIGNS

- 10 wiring member
- 10B wiring member
- 10C wiring member
- 101D wiring member
- 14 connector
- 20 sheet member (base member)
- 22 holding surface
- 28 missing wire-like transmission member identification mark
- 28*a* mark
- 30 electrical wire (wire-like transmission member)
- 32 core wire
- 34 covering
- 38 fusion part
- 110 wiring member
- 110B wiring member
- 110C wiring member
- 110D wiring member

The invention claimed is:

1. A wiring member, comprising:

a base member having a holding surface; and at least one wire-like transmission member held on the holding surface, wherein a plurality of missing wire-like transmission member identification marks, indicating a route of a missing wire-like transmission member, are provided on the holding surface, the at least one wire-like transmission member includes a plurality of wire-like transmission members, the plurality of wire-like transmission members extend in an extending direction and are held on the holding surface of the base member in parallel to each other in a parallelly held portion, the route of the missing wire-like transmission member extends in parallel to the plurality of the wire-like transmission members in the parallelly held portion, the plurality of missing wire-like transmission member identification marks include at least one of a middle identification mark provided between the plurality of wire-like transmission members or an outer side identification mark provided on an outer side position of the plurality of wire-like transmission members in an arrangement direction in the parallelly held portion, the arrangement direction being perpendicular to the extending direction in which the plurality of wire-like transmission members extend in the parallelly held portion, in the parallelly held portion, the plurality of wire-like transmission members are each fused to the holding surface at a plurality of fusion parts at a predetermined pitch in the extension direction, and in the parallelly held portion, the plurality of missing wire-like transmission member identification marks indicating the route of the missing wire-like transmission member are provided at the same pitch as the plurality of fusion parts in the extension direction so as to be respectively provided adjacent to the plurality of fusion parts in the arrangement direction.

2. The wiring member according to claim 1, wherein the plurality of missing wire-like transmission member identification marks are provided to indicate routes of plurality of missing wire-like transmission members.

3. The wiring member according to claim 1, wherein each of the missing wire-like transmission member identification marks is provided by a concave-convex shape formed using thermal energy for fusion.

4. The wiring member according to claim 1, further comprising first and second connectors, wherein the plurality of wire-like transmission members arranged in parallel to each other are connected between the first and second connectors, and the route of the missing wire-like transmission member is provided to connect between the first and second connectors.

5. The wiring member according to claim 1, wherein the route of the missing wire-like transmission member indicates a position where no wire-like transmission member is provided.

6. A method of manufacturing a wiring member including a base member having a holding surface and at least one wire-like transmission member held on the holding surface, wherein at least one missing wire-like transmission member identification mark indicating at least one missing wire-like transmission member position is provided on the holding surface, the wire-like transmission member includes a plurality of wire-like transmission members, at least a part of the plurality of wire-like transmission members are held in a parallel state, and the missing wire-like transmission member identification mark includes at least one of a middle identification mark provided between the plurality of wire-like transmission members or an outer side identification mark provided on an outer side position of the plurality of wire-like transmission members in an arrangement direction in a parallel portion in which at least a part of the plurality of wire-like transmission members is held in a parallel state on the holding surface, the arrangement direction being perpendicular to a direction in which the plurality of wire-like transmission members extend in the parallel portion, the method comprising:

fusing a wire-like transmission member of the plurality of wire-like transmission members in the parallel portion to the holding surface at a fusion part, and forming, at a position adjacent to the fusion part in the arrangement direction, the missing wire-like transmission member identification mark, on which the wire-like transmission member is not fused, using thermal energy for fusion, at a time of fusing the wire-like transmission member to the holding surface at the fusion part.

* * * * *